March 10, 1959
J. T. CATLETT
2,877,339
CRATER-FILLER CONTROL FOR ARC WELDING HEADS
Filed June 4, 1956
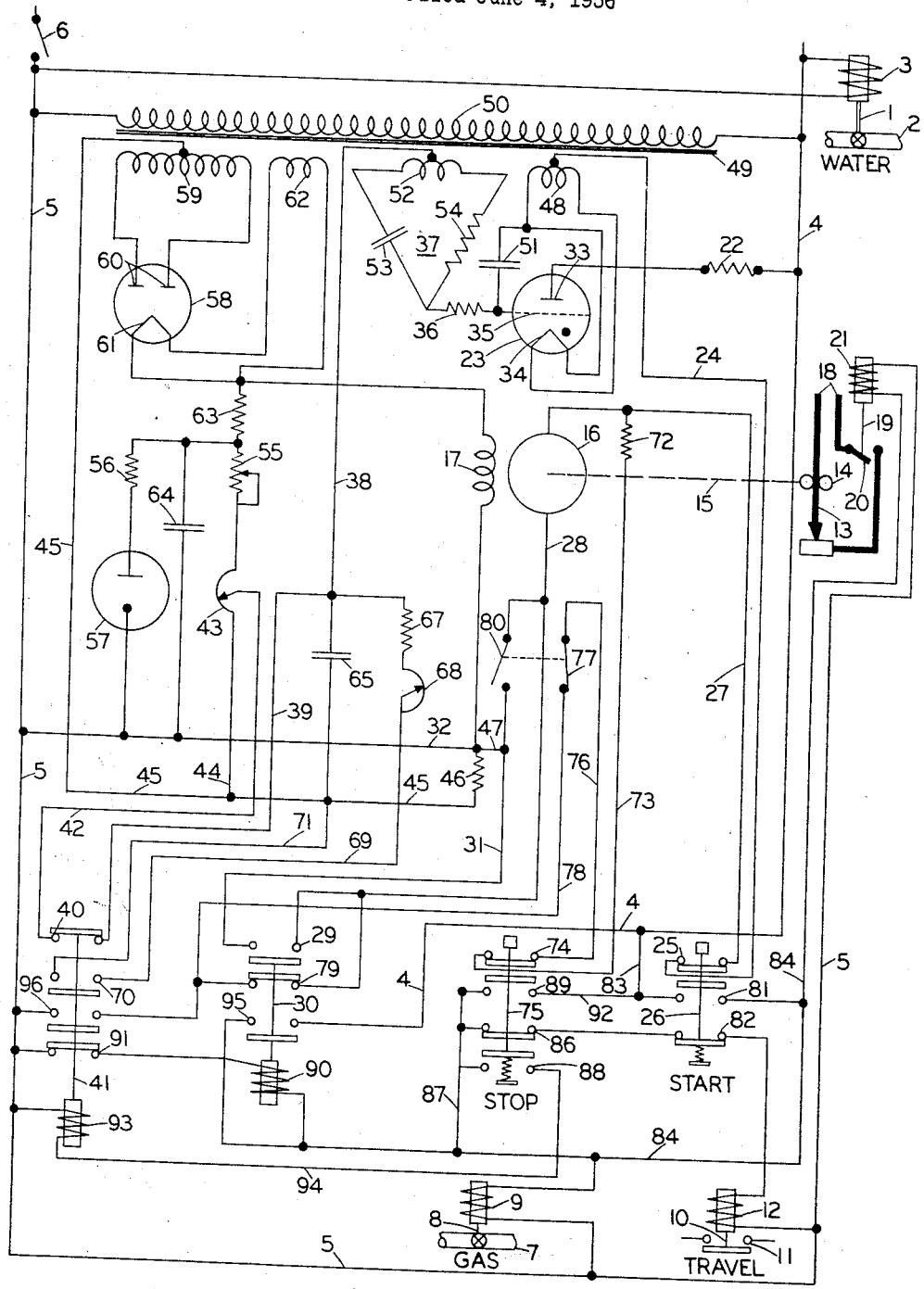
Inventor:
James T. Catlett
by Richard E. Horley
His Attorney

United States Patent Office 2,877,339
Patented Mar. 10, 1959

2,877,339

CRATER-FILLER CONTROL FOR ARC WELDING HEADS

James T. Catlett, York, Pa., assignor, by mesne assignments, to Air Reduction Company, Incorporated, New York, N. Y., a corporation of New York Application June 4, 1956, Serial No. 589,221

10 Claims. (Cl. 219—135)

My invention relates to a crater-filler control for arc welding heads.

During an arc welding operation, the welding arc produces a depressed area or crater in the molten metal of the work and this crater becomes a permanent part of the weld upon solidification of the molten metal in which it has been formed. The size of this crater will depend on the size of the electrode and on the magnitude of the welding current employed at the time of interrupting the welding operation. Crater filling devices have been used to reduce the welding current at the end of a weld to a value low enough to finish off the weld without leaving an appreciable crater. This is desirable since the crater not only detracts from the appearance of the weld but also seriously affects its strength since craters of large size may embody cracks which may grow and extend into the weld, causing it to break.

When using the usual drooping volt-ampere characteristic source of supply, it has been proposed to reduce the crater at the end of a weld by stopping the feeding of a fusible electrode one or two seconds before opening the welding circuit to interrupt the flow of welding current. By this procedure, the increase in length of the welding arc, resulting from the fusion of the electrode, causes a reduction in current flow and, consequently, a decrease in the size of the arc crater. Unless, however, the welding circuit is opened to stop the flow of welding current, the arc will become so long as to wander excessively with the result that the molten portions of the electrode are not deposited in the weld pool to assist in the crater-filling operation.

When welding with current densities in the electrode of the order of 40,000 to 280,000 amperes per square inch, the welding arc becomes self-regulating in that the current flow and electrode fusion rate vary in accordance with the speed at which the electrode is fed to the arc. With the conventional drooping volt-ampere characteristic source of supply, this self-regulating arc will vary in length and produce unsatisfactory welding conditions. If, however, such an arc is fed from a source of supply having, as evidenced at the arc, a rising volt-ampere characteristic of substantially the same form as its own rising volt-ampere characteristic, the welding current may be adjusted by adjusting the speed of electrode feed without causing a change in the length of the arc which is determined solely by the voltage adjustment of its source of supply. When employing this method of welding, which is more fully described in Letters Patent 2,680,181, Roger W. Tuthill and Alanson U. Welch, Jr., granted June 1, 1954, a crater-filling operation may be obtained by decreasing the electrode feeding speed of the welding head to decrease the welding current to a value at which the arc goes out for lack of sufficient energy to maintain it. When welding at high-current densities, with the usually available sources of welding current supply, the size of the electrode is less than one-eighth of an inch in diameter and this imposes electrode feeding speeds of up to 1000 inches per minute. The thinner the metal being welded, the smaller the electrode size and the higher the electrode feeding rate. Consequently, when welding thin metals, the presence of the weld crater becomes more pronounced and more objectionable. In some cases, the crater may be in fact a hole or crack in the work.

It is an object of my invention to provide a crater-filler control which will automatically decrease the electrode feeding speed at a predetermined rate from any speed at which the welding head has been operating to perform a desired welding operation. This control is of particular utility when welding with a source of supply having the above-referred to rising volt-ampere characteristic.

Further objects of my invention will become apparent from the following description thereof.

In a control embodying my invention, means are provided for setting the feeding rate of a fusible electrode at any desired value during a welding operation and a capacitor charged to a voltage corresponding to this electrode feeding rate is discharged at an adjustable rate to provide a decaying control voltage which decreases the electrode feeding speed at any desired rate to produce, when using a suitable source of welding current supply, a controlled reduction in the flow of welding current to a value at which the welding arc is extinguished and the welding operation is ended under conditions producing a weld crater-filling operation. Means are also provided in my control for interrupting this controlled decay in the electrode feeding speed and for simultaneously interrupting the flow of welding current independently of arc extinguishment due to a reduction in electrode feeding speed so that the welding operation may be ended at the will of the operator without encountering further delay or securing further crater-filling operation.

The following more complete description of my invention will be better understood by referring to the accompanying drawing which diagrammatically represents one embodiment thereof.

In one form of welding with a high-current density, self-regulating arc, a shielding gas is supplied about the arcing terminal of the electrode, the arc, and the portions of the work rendered molten thereby. This shielding gas is usually supplied through a torch which embodies means for directing the electrode toward the work and supplying welding current to it near its arcing terminal. Means are also provided in the torch for circulating cooling fluid through it in order to prevent its destruction due to the heat of the arc. In automatic or semi-automatic arc welding, a suitable driving mechanism is provided for feeding the electrode through the torch at a selected adjustable rate of speed and switching means is also provided in the welding circuit for interrupting the flow of welding current without depending on the extinguishing of the arc to accomplish this result. Some means is also provided in automatic arc welding for traversing the welding head and work relative to one another along a desired line of welding. This means usually embodies a travel motor, the energization and de-energization of which is suitably controlled to start and stop the travel motion in accordance with the welding operation being performed.

In the accompanying drawing, the supply of cooling fluid for the welding torch is controlled by a solenoid operated valve 1 which controls the flow of water to the torch through a conduit 2 and has an operating winding 3 which is connected across supply conductors 4, 5 which may be energized from a suitable source of alternating current supply by closing a switch 6. Shielding gas is supplied to the welding torch through a conduit 7 having a solenoid valve 8 for controlling the flow of gas in accordance with the energization of its operating winding 9 which is also connected across the supply conductors 4, 5 by switching means which will be described below.

Relative travel of the welding head and the work is controlled by a travel relay 10 having normally open contacts 11 and an operating winding 12 whose energization from supply conductors 4, 5 is controlled by the switching means to be described below. The welding electrode 13 is fed toward the work by means of a welding head having feed rolls 14 which are mechanically connected by a transmission 15 to the armature 16 of a feed motor having a field winding 17. The welding head embodying these feed rolls and feed motor may have the construction disclosed and claimed in my co-pending application Serial No. 589,220 for Arc Welding Head, filed concurrently herewith. The welding circuit 18 may include a magnetic contactor 19 having contacts 20 and an operating winding 21 which is controlled by the switching means which will be described below. These several features of my invention have not been coordinated with one another in a specific arc welding apparatus since the invention hereof is concerned primarily with the control for the feed motor forming a part of the welding head.

The armature 16 of the feed motor is connected across supply conductors 4, 5, through a resistor 22, an arc discharge device 23, a conductor 24, the normally closed contacts 25 of a start switch 26, conductors 27 and 28, the normally open contacts 29 of a control relay 30 and conductors 31, 47, and 32. The arc discharge device 23 has an anode 33, a cathode 34, and a control element 35. The excitation supplied between its control element 35 and its cathode 34 determines the point in the positive half-cycle of its anode voltage at which current flow is initiated and consequently controls the magnitude of the voltage of supply conductors 4, 5 which is supplied to the armature 16 of the feed motor to control its speed of rotation.

The control circuit for arc discharge device 23 extends from its control element 35 through a current limiting resistor 36, a bridge-type phase-shift circuit 37, conductors 38 and 39, normally closed contacts 40 of a crater-filler relay 41, a conductor 42, a section of adjustable potentiometer 43, conductors 44 and 45, a resistor 46, conductors 47 and 31, normally open contacts 29 of control relay 30, conductor 28, armature 16 of the feed motor, conductor 27, normally closed contacts 25 of starting switch 26 and conductor 24 to the cathode 34 of this arc discharge device. The phase-shift circuit 37 provides a control voltage which lags by 90° the anode voltage of arc discharge device 23 and the zero axis of this phase shift control voltage is displaced negatively relative to the zero axis of the anode voltage of arc discharge device 23 by the voltage drop across resistor 46 so that, insofar as these two voltages are concerned, arc discharge device 23 is biased off. The arc discharge device is biased on by a positive turn-on voltage which appears across the section of adjustable potentiometer 43 in its control element circuit and which is in opposition to negative hold-off counter-electromagnetic force voltage of armature 16 of the feed motor. Consequently, depending upon the setting of potentiometer 43, the feed motor will operate at a speed which is maintained by the controlled conductivity of arc discharge device 23 resulting from the algebraic sum of the several control voltages in its control element circuit above described.

The cathode 34 of arc discharge device 23 is energized from the secondary 48 of a transformer 49 having a primary winding 50 which is connected across the supply conductors 4, 5. A stabilizing capacitor 51 is connected between the control element and cathode of this arc discharge device. The control element phase-shift circuit 37 comprises a mid-tapped secondary winding 52 of transformer 49, a capacitor 53, and a resistor 54 connected in series circuit with one another and having one output terminal at the mid-tap of winding 52 and its other output terminal between its capacitor and resistor. A substantially constant voltage is applied across potentiometer 43 through an adjustable resistor 55 by the voltage drop across a resistor 56 and a voltage regulating vacuum tube 57. Resistor 56 and voltage regulating tube 57 are energized by a full-wave rectifier including a rectifier vacuum tube 58 and the mid-tapped secondary 59 of transformer 49. Rectifier tube 58 has anodes 60 connected to the outer end terminals of secondary windings 59 of transformer 49 and a cathode 61 which is heated by the secondary 62 of transformer 49. Output current from the rectifier tube passes through resistors 63 and 56, voltage regulating tube 57, conductor 32, resistor 46, and conductor 45 to the mid tap of secondary winding 59 of transformer 49. The output voltage of resistor 56 and voltage regulating tube 57 is stabilized by a filter capacitor 64 connected in shunt thereto. Field winding 17 of the electrode feed motor is also connected in circuit with rectifier tube 58 through resistor 46. The current flowing in this circuit provides a substantially constant motor field excitation and a negative bias voltage drop across resistor 46 in the control element circuit of arc discharge device 23.

The controlled charge on a capacitor 65 and its controlled rate of discharge is employed for producing a desired slow-down of the feed motor 16, 17 at the end of a welding operation. This capacitor 65 is charged to the adjusted voltage of potentiometer 43 through a charging circuit comprising conductors 39, normally closed contacts 40 of crater-filler relay 41, and conductors 42, 44, and 45. It will be noted that this capacitor 65 is connected in the control element circuit of arc discharge device 23. A desired rate of voltage decay of capacitor 65 is obtained by connecting across its terminals a discharge circuit including a fixed resistor 67, an adjustable resistor 68, a conductor 69, the normally open contacts 70 of crater-filler relay 41, and a conductor 71.

The feed motor is provided with a dynamic braking circuit including a resistor 72, a conductor 73, normally closed contacts 74 of a stop switch 75, a conductor 76, the contacts of a threading switch 77, a conductor 78, the normally closed contacts 79 of control relay 30, and conductor 28. The armature circuit of the feed motor may be completed through a threading switch 80 which is connected in shunt to the normally open contacts 29 of control relay 30. Threading switches 77 and 80 are mechanically interlocked so that closure of one opens the other and vice versa.

Start switch 26 is also provided with normally open contacts 81 and normally closed contacts 82. Normally open contacts 81 control the energization of the operating winding 90 of control relay 30 by controlling its connection across supply conductors 4, 5 through conductors 83, 92, 84 and the normally closed contacts 91 of crater-filler relay 41. These contacts also control the energization of operating winding 21 of welding circuit contactor 19 and the energization of operating winding 9 of solenoid-operated gas valve 8, by controlling their connection across supply conductors 4, 5 through conductors 83 and 84. Normally closed contacts 82 are in the energizing circuit of operating winding 12 of travel relay 10 and control its energization from supply conductors 4, 5 through a circuit which also includes the normally closed contacts 86 of stop switch 75, conductors 87 and 84 and contacts 95 of control relay 30. Stop switch 75 also has normally open contacts 88 and 89. Normally open contacts 89 control the energization of operating winding 90 of control relay 30 through a circuit which is completed through the normally closed contacts 91 of crater-filler relay 41 and conductors 84, 87, 92, and 83. Normally open contacts 88 of stop switch 75 control the energization of operating winding 93 of crater-filler relay 41 through conductors 94 and 87, contacts 89 of stop switch 75 and conductors 92 and 83. Control relay 30 also has normally open contacts 95 which complete a holding circuit for its operating winding 90 as well as for winding 9 of gas valve 8 and winding 21 of contactor 19. Crater-filler relay 41 also has normally open contacts 96 which, in conjunction with the normally closed contact 79 of control relay 30, completes the control circuit of discharge device 23 when it is subject to the slow-down control imposed by the decaying voltage of capacitor 65.

The organization of my system will be more fully understood by considering the operation thereof under the control of the start and stop switches 26 and 75.

In the drawing, the relays have been illustrated in their de-energized position and the start and stop switches have been illustrated in the positions in which they are held by their spring-operated biasing means. The control is de-energized by reason of switch 6 being open.

Upon closure of switch 6, supply conductors 4, 5 are energized by alternating current of commercial frequency and voltage by being connected to a suitable source of supply not shown in the drawing. Immediately upon energization of conductors 4, 5, the operating winding 3 of solenoid operated water valve 1 is energized and this valve opens to supply cooling water to the welding torch. Primary 50 of transformer 49 is also energized and, through its secondary filament windings 48 and 62, supplies heating current to the cathodes 34 and 61 of arc discharge device 23 and rectifier vacuum tube 58. Anode voltage is also supplied to rectifier tube 58 through secondary 59 of the transformer and current flows from the rectifier 58, 59 through the feed motor field winding 17 and resistor 46 to energize the field winding and produce a voltage drop across resistor 46 which is in the control element circuit of arc discharge device 23. At the same time, a regulated voltage is produced across resistor 56 and the voltage-regulating vacuum tube 57 by current flow from the rectifier through resistors 63, 56, tube 57, conductor 32, resistor 46, and conductor 45. The regulated voltage across resistor 56 and tube 57 appears across adjustable resistor 55 and adjustable potentiometer 43. The phase shift circuit 37 in the excitation circuit of arc discharge device 23 is also energized by the voltage induced in the secondary winding 52 of transformer 49. The circuit through armature 16 of the feed motor is open at contacts 29 of control relay 30 and consequently the feed motor armature is deenergized and at rest. The feed motor circuit extends from conductor 4 through resistor 22, the anode-cathode circuit of arc discharge device 23, conductor 24, contacts 25 of start switch 26, conductor 27, armature 16 of the feed motor, conductor 28, contacts 29 of control relay 30, and conductors 31, 47, and 32 to supply conductor 5.

When the start switch 26 is depressed, it opens its contacts 25 and 82 and closes its contacts 81. The opening of its contacts 25 interrupts the circuit through the feed motor armature 16 even though contacts 29 of control relay 30 are closed. The closure of its contacts 81 completes the energizing circuits for control relay 30, the solenoid operated gas valve 8, and the welding circuit contactor 19. Gas is thus supplied about the arcing terminal of the electrode 13 and the work through the welding torch and the welding circuit is completed except for the gap between the welding electrode and the work. Pick-up of control relay 30 closes its contacts 29 which are in the armature circuit of the feed motor, but this circuit is not completed across supply conductors 4, 5 due to the opening of contacts 25 of start switch 26. Pick-up of control relay 30 also opens its contacts 79 to open the dynamic braking circuit of the feed motor through resistor 72. Pick-up of control relay 30 also closes its contacts 95 to provide a holding circuit by which its operating winding 90 is energized from supply conductors 4, 5 through these contacts and contacts 91 of crater-filler relay 41.

Upon depression of start switch 26, the circuit through the operating winding 90 of control relay 30 is completed from conductor 4 through conductors 83 and 92, contacts 81 of start switch 26, conductor 84, and contacts 91 of crater-filler relay 41 to supply conductor 5. At the same time, the circuit through operating winding 9 of solenoid-operated gas-valve 8 is completed from supply conductor 4 through conductors 83 and 92, contacts 81 of start switch 26 and conductor 84 to supply conductor 5. Also at the same time, the operating winding 21 of welding contactor 19 is energized through a circuit completed from supply conductor 4 through conductors 83 and 92, contacts 81 of start switch 26 and conductor 84 to the other supply conductor 5. Depression of the start switch also opens its contacts 82 which interrupts the energizing circuit of travel relay 10 so that its contacts 11 will remain open and the travel mechanism will remain de-energized. Consequently, when start switch 26 is depressed, gas is flowing through the welding torch to purge it, the travel mechanism is de-energized, as is the electrode feed motor, and the welding circuit is completed except for the gap between the welding electrode 13 and the work.

When the operator releases start switch 26, it closes its contacts 25 to complete the armature circuit of the feed motor across supply conductors 4, 5. The feed motor consequently starts to run and comes up to a speed determined by the adjustment of potentiometer 43 which is in the control element circuit of arc discharge device 23. This control element circuit was partly completed upon closure of contacts 29 of control relay 30 and extends from control element 35 of arc discharge device 23 through resistor 36, phase-shift circuit 37, conductors 38 and 39, contacts 40 of crater-filler relay 41, conductor 42, the lower portion of potentiometer 43, conductors 44 and 45, resistor 46, conductors 47 and 31, contacts 29 of control relay 30, conductor 28, the armature 16 of the feed motor, conductor 27, contacts 25 of start switch 26, conductor 24, to cathode 34 of the arc discharge device 23. The feed motor armature will be energized through arc discharge device 23 in accordance with the negative hold-off counterelectromotive force voltage of its armature and the adjustable turn-on voltage of potentiometer 43 and will operate at a speed determined by the adjustment of potentiometer 43. This will cause the feed motor to propel the welding electrode 13 toward the work at a substantially constant rate of speed and when the electrode engages the work, its terminal portion will be fused and fall away to form an arc which will thereafter be maintained between the electrode and the work by the self-regulating action of the welding arc above referred to. The operating winding 21 of welding circuit contactor 19 and the operating winding 9 of solenoid-operated gas valve 8 will remain energized even though contacts 81 of start switch 26 are now open because the circuit completed through contacts 95 of control relay 30 will connect conductor 84 to supply conductor 4 and thereby complete the energizing circuit of these devices through their operating windings to supply conductor 5. The closing of contacts 82 of the start switch will energize the operating winding 12 of the travel relay 10 by completing a circuit from supply conductor 4 through contacts 95 of control relay 30, conductors 84 and 87, contacts 86 of stop switch 75 and contacts 82 of start switch 26 to supply conductor 5. Travel relay 10 will consequently close its contacts and energize the travel mechanism to produce relative movement between the welding head and the work being welded.

The operator can stop the welding operation and secure a crater-filling action by depressing stop switch 75 to open its contacts 74 and 86 and close its contacts 88 and 89. The opening of contacts 74 opens the dynamic braking circuit of the feed motor and the opening of contacts 86 opens the energizing circuit of the operating winding 12 of the travel relay and stops relative travel between the welding head and the work. The closure of contacts 88 and 89 will complete an energizing circuit for the operating winding 93 of crater-filler relay 41 from supply conductor 4 through conductors 83, 92, 87, and 94 to the other supply conductor 5. As soon as contacts 91 of crater-filler relay 41 open, the operating winding 90 of control relay 30 will be de-energized to open its contacts 29 and 95 and close its contacts 79. Contacts 79 of control relay 30 are in the dynamic braking circuit of the feed motor but this circuit is not completed due to the opening of contacts 74 of stop switch 75.

So long as stop switch 75 is held depressed, crater-filler relay 41 will remain picked-up. Pick-up of this relay opened its contacts 40 which are in the charging circuit for control capacitor 65 and closed its contacts 70 which are in the discharge circuit for this capacitor. Consequently, upon operation of crater-filler relay 41, speed control of the feed motor is transferred from potentiometer 43 to the decaying voltage across capacitor 65 which is connected in the control element circuit or arc discharge device 23 through a circuit which is now completed through resistor 36, phase shift circuit 37, conductors 38 and 45, resistor 46, conductors 32 and 5, contacts 96 of relay 41, contacts 79 of relay 30, conductor 28, armature 16 of the feed motor, conductor 27, contacts 25 of start switch 26, and conductor 24 to cathode 34 of the arc discharge device 23. As the voltage across capacitor 65 decays in accordance with the adjustment of its discharge circuit through resistors 67 and 68, the speed of the feed motor will be decreased by the controlled decreased conductivity time of arc discharge device 23. This will, with a rising volt-ampere characteristic source of welding current supply, progressively decrease the flow of welding current until the arc goes out due to lack of energy. During this period of time, the crater in the work will be progressively reduced in size and the desired crater-filler operation will be obtained.

During this crater-filler operation, the welding circuit contactor 19 holds its switch 20 in the closed position due to the energization of its operating winding 21 which is connected across supply conductors 4, 5 through conductors 83 and 92, contacts 89 of stop switch 75, and conductors 87 and 84. If at any time the welding operator wishes to stop the crater-filler operation, he can do so by releasing stop switch 75 which will open its contacts 89 and, consequently, de-energize the welding circuit contactor 19 so that it will open its contacts 20 in the welding circuit. At the same time, contacts 74 of stop switch 75 are closed to complete the dynamic braking circuit of the feed motor through resistor 72, conductors 73, 76, threading switch 77, conductor 78, contacts 79 of control relay 30 and conductor 28. Release of the stop switch 75 will also open its contacts 88 and de-energize the operating winding 93 of crater-filler relay 41. Travel relay 10 will also be de-energized by the release of stop switch 75 and the opening of its contacts 89 so that this relay will remain de-energized as it became when the stop switch was depressed to initiate the crater-filler operation. Consequently, upon release of stop switch 75, the circuit relays are returned to their initial starting positions as shown in the drawing and described above at the beginning of this description of the operation of the system.

It is desirable to thread the welding electrode through the welding head and welding torch while the welding circuit is open so that, during this threading operation, there is no possibility of striking arcs which might be injurious to the operator or to the welding equipment. This may be accomplished by operating threading switch 77, 80. As previously noted, when switch 80 is closed, switch 77 is open and when switch 80 is open, switch 77 is closed. Closure of switch 80 completes a circuit through the feed motor armature 16 across supply conductors 4, 5 and closure of switch 77 completes the dynamic braking circuit of the feed motor when the start and stop switches, the control relay, and the crater-filler relay are in the positions illustrated in the drawing and, as a result thereof, welding circuit contactor 19 is de-energized, gas valve 8 is closed, and travel relay 10 is de-energized.

While my above-described crater-filler control for arc welding heads is most advantageously applied when welding with a high-current density, self-regulating arc supplied from a source of welding current having a rising volt-ampere characteristic as pointed out above, it is obvious that it may also be employed where the welding current is supplied from a welding source having a substantially constant voltage output. In such an arrangement, the length of the welding arc will increase while the electrode feeding speed and welding current is being decreased by the electrode feed motor control, but the decrease in welding current will be sufficient to secure a satisfactory crater-filling operation. The control might also be employed where the welding source has a drooping characteristic but the operator would have to terminate the crater-filler operation by operating the stop switch to open the welding circuit at the contacts of the welding circuit contactor and the crater-filler operation would not be as pronounced as when using a source of supply having a substantially constant output voltage or a rising volt-ampere characteristic which latter is, of course, the most satisfactory source of welding current supply when using my crater-filler control.

In view of the above-description of one embodiment of my invention, it will be obvious to those skilled in the art that capacitor 65 may be variously connected as an element in a control circuit for the electrode feed motor in order to secure its controlled slowdown at the end of a welding operation. For example, capacitor 65 could be connected through normally closed contacts of crater-filler relay 41 across resistor 56, tube 57, and resistor 46 and the voltage dividing circuit including adjustable resistor 55 and potentiometer 43 could be permanently connected across the terminals of capacitor 65 in shunt to the discharge circuit for capacitor 65 which would also be directly connected across capacitor 65. In this arrangement, the slider of potentiometer 43 would be directly connected to the phase-shift circuit 37. Other arrangements will occur to those skilled in the art. It is also obvious that, in view of my above disclosure, other feed motor control arrangements embodying such a capacitor and the employment of the decaying voltage therefor for obtaining a controlled slow-down of the feed motor may be employed without departing from the spirit and scope of my invention.

Thus, while I have described but one embodiment of my invention, it is my intention to cover all changes and modifications thereof which fall within the true spirit and scope of my invention as pointed out in the appended claims.

What I claim as new and desire to secure by Letters Patent of the United States is:

1. Arc welding apparatus comprising a welding circuit including a fusible electrode which is consumed in the arc during a welding operation, a switch in said welding circuit, means including feed rolls for making a driving engagement with said fusible electrode, a feed motor having a rotating armature mechanically connected with said feed rolls to impart rotation thereto, means for closing said welding circuit switch and for initiating operation of said feed motor, means including a control circuit in which a capacitor is connected in series circuit with said feed motor armature for controlling the speed of rotation of said feed motor armature, means for applying to said capacitor a voltage which is in opposition to the counterelectromotive force voltage of said feed motor armature and which is of a predetermined selected value which is adjustable, a capacitor discharge circuit, means rendering said capacitor discharge circuit effective for producing across said capacitor a controlled rate of voltage decay from a voltage value thereof which corresponds to that applied thereto by said last-mentioned means, and means for interrupting the operation of said last-mentioned means and for opening said welding circuit switch.

2. Arc welding apparatus for controlling the speed of rotation of an electrode feed motor, said apparatus comprising supply conductors, a voltage varying means having an output circuit connectable in series with the armature circuit of an electrode feed motor across said supply conductors and having means including an input circuit connectable in series with the armature circuit of said electrode feed motor for varying the output voltage of said voltage varying means in accordance with the resultant voltage in said input circuit when it is completed through the armature circuit of said electrode feed motor, a capacitor connected in said input circuit of said voltage varying means, a capacitor charging circuit for applying directly to said capacitor a predetermined adjustable voltage opposing the counterelectromotive force voltage of said feed motor armature when it is connected in circuit therewith, means for operating said voltage varying means under control of said capacitor charged to the voltage of said capacitor charging circuit, a capacitor discharge circuit, and means rendering said capacitor discharge circuit effective for producing across said capacitor a controlled rate of voltage decay from a voltage value thereof which corresponds to that applied thereto by said capacitor charging circuit.

3. Arc welding apparatus comprising means including a welding circuit for supplying current to a fusible electrode which is consumed in the arc during a welding operation, a switch in said welding circuit, means including feed rolls for making a driving engagement with a fusible arc welding electrode, a feed motor having a rotating armature mechanically connected with said feed rolls to impart rotation thereto, supply conductors, a voltage varying means having an output circuit electrically connected in series circuit with said feed motor armature across said supply conductors and having means including an input circuit for varying its output voltage in accordance with the resultant voltage in its said input circuit, a capacitor, means for charging said capacitor, means for applying in the input circuit of said voltage varying means and in opposition to the counterelectromotive force voltage of said feed motor armature a voltage derived from said capacitor, means for closing said welding circuit switch and for initiating operation of said feed motor under the control of said voltage derived from said capacitor, a capacitor discharge circuit, means for rendering said capacitor discharge circuit effective in producing a decay in the voltage derived from said capacitor and applied in the input circuit of said voltage varying means, and means for interrupting the operation of said last-mentioned means and for opening said welding circuit switch.

4. Arc welding apparatus comprising means including a welding circuit for supplying current to a fusible electrode which is consumed in the arc during a welding operation, a switch in said welding circuit, means including feed rolls for making a driving engagement with a fusible arc welding electrode, a feed motor having a rotating armature mechanically connected with said feed rolls to impart rotation thereto, supply conductors, a voltage varying means having an output circuit electrically connected in series circuit with said feed motor armature across said supply conductors and having means including an input circuit for varying its output voltage in accordance with the resultant voltage in its said input circuit, a capacitor, means for charging said capacitor, means for applying in the input circuit of said voltage varying means and in opposition to the counterelectromotive force voltage of said feed motor armature a voltage derived from said capacitor, means for closing said welding circuit and for initiating operation of said feed motor under the control of said voltage derived from said capacitor, a capacitor discharge circuit, and means for rendering said capacitor discharge circuit effective in producing a decay in the voltage derived from said capacitor and applied in the input circuit of said voltage varying means, and means for interrupting the operation of said last-mentioned means and for opening said welding circuit switch.

5. Arc welding apparatus comprising means including a welding circuit for supplying current to a fusible electrode which is consumed in the arc during a welding operation, a switch in said welding circuit, means including feed rolls for making a driving engagement with said fusible electrode, a feed motor having a rotating armature mechanically connected with said feed rolls to impart rotation thereto, supply conductors, a voltage varying means having an output circuit electrically connected in series circuit with said feed motor armature across said supply conductors and having means including an input circuit for varying its output voltage in accordance with the resultant voltage in its said input circuit, a capacitor connected in said input circuit of said voltage varying means in series with said feed motor armature, a capacitor charging circuit for applying a predetermined adjustable voltage to said capacitor which is in opposition to the counterelectromotive force voltage of said feed motor armature, means for closing said welding circuit switch and for initiating operation of said feed motor with said capacitor charged to the voltage of said capacitor charging circuit, a capacitor discharge circuit, means for rendering said capacitor discharge circuit effective in producing across said capacitor a controlled rate of voltage decay from the voltage applied thereto by said capacitor charging circuit, and means for interrupting the operation of said last-mentioned means and for opening said welding circuit switch.

6. Arc welding apparatus comprising a welding circuit including a fusible electrode which is consumed in the arc during the welding operation, a switch in said welding circuit, means including feed rolls for making a driving engagement with said fusible electrode, an electric motor having its armature mechanically connected with said feed rolls for imparting rotation thereto, supply conductors, a voltage varying means having an output circuit electrically connected in series with said feed motor armature across said supply conductors and having means including an input circuit for varying its output voltage in accordance with the resultant voltage in its said input circuit, a capacitor connected in said input circuit of said voltage varying means in series with said feed motor armature, a capacitor charging circuit for applying a predetermined adjustable voltage to said capacitor which is in opposition to the counterelectromotive force voltage of said feed motor armature, means including a capacitor discharge circuit for controlling the voltage decay across said capacitor, and switching means having a normal operating position and first and second stop positions, said switching means in its normal operating position opening said capacitor discharge circuit and closing said welding circuit switch, said capacitor charging circuit, and the input and output circuits of said variable voltage means through said feed motor armature, in its first stop position opening said capacitor charging circuit, closing said capacitor discharge circuit and maintaining the closure of said welding circuit switch and said input and output circuits of said voltage variable means through said feed motor armature and in its second stop position opening said welding circuit switch and said input and output circuits of said variable voltage means through said feed motor armature.

7. Apparatus for controlling the feeding of a fusible electrode during an arc welding operation, said apparatus comprising electrode feed rolls, an electric feed motor having its armature mechanically connected with said feed rolls for imparting rotation thereto, supply conductors, a voltage varying means having an output circuit electrically connected in series with said feed motor armature across said supply conductors and having means including an input circuit for varying its output voltage in accordance with the resultant voltage in its said input circuit, a capacitor connected in said input circuit of said voltage varying means in series with said feed motor armature, means including a capacitor charging circuit for applying a predetermined adjustable voltage to said capacitor which is in opposition to the counterelectromotive force voltage of said feed motor armature, means including a capacitor discharge circuit for controlling the voltage decay across said capacitor, means including a circuit which when energized applies a braking force to said feed motor armature, first and second switch means, each having normally open and normally closed contacts, said first switching means having normally closed contacts controlling energization of said braking circuit and normally open contacts controlling the energization of said feed motor armature through said variable voltage means from said supply conductors, and said second switching means having normally closed contacts in said capacitor charging circuit, normally open contacts in said capacitor discharge circuit and normally open contacts connected in series with said normally closed contacts of said first switching means across said normally open contacts of said first switching means, means for operating said first switching means and holding it in its operated position, and means for operating said second switching means and concurrently therewith reversely operating said first switching means.

8. Arc welding apparatus comprising means including a welding circuit for supplying current to a fusible electrode which is consumed in the arc during a welding operation, a switch in said welding circuit, means including feed rolls for making a driving engagement with said fusible electrode, a feed motor having a rotating armature mechanically connected with said feed rolls to impart rotation thereto, supply conductors, an arc discharge device having an anode, a cathode, a control element, and a control element circuit between its said control element and cathode, means including the anode-cathode circuit of said arc discharge device for controlling the magnitude of voltage supplied to said feed motor armature from said supply conductors, means for introducting into said control element circuit of said electric discharge device a turn-on phase-shift voltage and a negative hold-off voltage, a capacitor connected in said control element circuit of said electric discharge device in series with said feed motor armature, said phase-shift voltage and said negative hold-off voltage, a capacitor charging circuit for applying a predetermined adjustable voltage to said capacitor which is in opposition to the counterelectromotive force voltage of said feed motor armature, means for closing said welding circuit switch and for initiating operation of said feed motor with said capacitor charged to the voltage of said capacitor charging circuit, a capacitor discharge circuit, means for rendering said capacitor discharge circuit effective in producing across said capacitor a controlled rate of voltage decay from the voltage applied thereto by said capacitor charging circuit, and means for interrupting the operation of said last-mentioned means and for opening said welding circuit switch.

9. Arc welding apparatus comprising a welding circuit for supplying current to a fusible electrode which is consumed in the arc during a welding operation, a switch in said welding circuit, means including feed rolls for making a driving engagement with a fusible arc welding electrode, a feed motor having a rotating armature mechanically connected with said feed rolls to impart rotation thereto, supply conductors, an arc discharge device having an anode, a cathode, a control element, and a control element circuit between its said control element and cathode, means including the anode-cathode circuit of said arc discharge device for controlling the magnitude of voltage supplied to said feed motor armature from said supply conductors, means for introducing into said control element circuit of said electric discharge device a turn-on phase-shift voltage, a negative hold-off voltage, an adjustable positive turn-on voltage, and the counterelectromotive force voltage of said feed motor armature which is in opposition to said positive turn-on voltage, a capacitor, means for applying a voltage charge to said capacitor, means for deriving said positive turn-on voltage of said control element circuit of said electric discharge device from said charged capacitor, means for closing said welding circuit switch and for initiating operation of said electrode feed motor with said positive turn-on voltage of said control element circuit of said electric discharge device derived from said charged capacitor, a capacitor discharge circuit, means for rendering said capacitor discharge circuit effective in producing across said capacitor a controlled rate of voltage decay from the voltage applied thereto by said capacitor charging means, and means for interrupting the operation of said last-mentioned means and for opening said welding circuit switch.

10. Apparatus for controlling the feeding of a fusible electrode during an arc welding operation, said apparatus comprising electrode feed rolls, a feed motor having a rotating armature mechanically connected with said feed rolls to impart rotation thereto, supply conductors, an arc discharge device having an anode, a cathode, a control element, and a control element circuit between its said control element and cathode, means including the anode-cathode circuit of said arc discharge device for controlling the magnitude of voltage supplied to said feed motor armature from said supply conductors, means for introducing into said control element circuit of said electric discharge device a turn-on phase-shift voltage, a negative hold-off voltage, a positive turn-on voltage and the counterelectromotive force voltage of said feed motor armature which is in opposition to said positive turn-on voltage, a capacitor, means including a capacitor charging circuit for applying said positive turn-on voltage of said control element circuit of said electric discharge device to said capacitor, means including a capacitor discharge circuit for controlling the voltage delay across said capacitor, means including a circuit which when energized applies a braking force to said feed motor armature, first and second switch means, each having normally open and normally closed contacts, said first switching means having normally closed contacts controlling the energization of said braking circuit and normally open contacts controlling the energization of said feed motor armature through said anode-cathode circuit of said electric discharge device from said supply conductors, and said second switching means having normally closed contacts in said capacitor charging circuit, normally open contacts in said capacitor discharge circuit and normally open contacts connected in series with said normally closed contacts of said first switching means across said normally open contacts of said first switching means, means for operating said first switching means and holding it in its operated position, and means for operating said second switching means and concurrently therewith reversely operating said first switching means.

References Cited in the file of this patent

UNITED STATES PATENTS

| | | |
|---|---|---|
| 1,701,372 | Jefts | Feb. 5, 1929 |
| 2,152,785 | Blankenbuehler | Apr. 4, 1939 |
| 2,445,430 | Herschenroeder et al. | July 20, 1948 |
| 2,472,046 | Malcolm | July 31, 1949 |
| 2,680,181 | Tuthill et al. | June 1, 1954 |
| 2,753,506 | Elliot | July 3, 1956 |
| 2,785,368 | Elliot | Mar. 12, 1957 |